United States Patent
Boulos et al.

(10) Patent No.: US 8,579,544 B2
(45) Date of Patent: Nov. 12, 2013

(54) COMBINED CHEMICAL OXIDATION/ASSISTED BIOREMEDIATION OF CONTAMINANTS

(75) Inventors: Noel Boulos, Bellaire, TX (US); Alastair McNeillie, Humble, TX (US); Jason Muessig, Houston, TX (US)

(73) Assignee: SOLVAY (Societe Anonyme), Brussels (BE)

( * ) Notice: Subject to any disclaimer, the term of this patent is extended or adjusted under 35 U.S.C. 154(b) by 0 days.

(21) Appl. No.: 12/906,282

(22) Filed: Oct. 18, 2010

(65) Prior Publication Data

US 2011/0031185 A1 Feb. 10, 2011

Related U.S. Application Data

(62) Division of application No. 11/597,666, filed as application No. PCT/EP2005/052409 on May 26, 2005, now abandoned.

(60) Provisional application No. 60/574,864, filed on May 27, 2004.

(51) Int. Cl.
*B09C 1/08* (2006.01)

(52) U.S. Cl.
USPC ............ 405/128.5; 405/128.75; 405/129.25; 210/631; 210/759; 588/313; 588/320; 252/186.27; 252/186.29

(58) Field of Classification Search
USPC ............ 405/128.5, 128.75, 129.25; 210/631, 210/759; 588/313, 320; 252/186.27, 186.29
See application file for complete search history.

(56) References Cited

U.S. PATENT DOCUMENTS

| | | |
|---|---|---|
| 5,741,427 A | 4/1998 | Watts et al. |
| 6,160,194 A | 12/2000 | Pignatello |
| 6,268,205 B1 | 7/2001 | Kiest et al. |
| 6,319,328 B1 | 11/2001 | Greenberg et al. |
| 6,843,618 B2 | 1/2005 | Lundy |
| 2002/0110509 A1 | 8/2002 | Lundy |

FOREIGN PATENT DOCUMENTS

| | | |
|---|---|---|
| EP | 1 724 237 | 11/2006 |
| WO | 02 064718 | 8/2002 |

*Primary Examiner* — Gregory Delcotto
(74) *Attorney, Agent, or Firm* — Oblon, Spivak, McClelland, Maier & Neustadt, L.L.P.

(57) ABSTRACT

A method for the combined chemical oxidation/assisted bioremediation of contaminated materials, comprising contacting a contaminated material with at least one metal chelate and at least one peroxide compound.

15 Claims, No Drawings

US 8,579,544 B2

COMBINED CHEMICAL OXIDATION/ASSISTED BIOREMEDIATION OF CONTAMINANTS

REFERENCE TO PRIOR APPLICATIONS

This application is a Divisional application of U.S. Ser. No. 11/597,666, filed Jan. 3, 2007, now abandoned; which is a 371 application of PCT/EP05/52409, filed May 26, 2005; and claims benefit of U.S. Provisional application Ser. No. 60/574,864, filed May 27, 2004.

FIELD OF THE INVENTION

The invention relates in general to compositions and methods for cleaning contaminated materials such as soil and water.

Additional advantages and other features of the present invention will be set forth in part in the description that follows and in part will become apparent to those having ordinary skill in the art upon examination of the following or may be learned from the practice of the present invention. The advantages of the present invention may be realized and obtained as particularly pointed out in the appended claims. As will be realized, the present invention is capable of other and different embodiments, and its several details are capable of modifications in various obvious respects, all without departing from the present invention. The description is to be regarded as illustrative in nature, and not as restrictive.

SUMMARY OF THE INVENTION

The invention objectives are accomplished, in general, by the combined use of metal (e.g., Fe) chelates, especially transition metal chelates, and a source of peroxide, especially Mg, Ca, and/or Zn peroxide or sodium percarbonate (PCS) or hydrogen peroxide. An underlying concept is the reaction of hydrogen peroxide which is used as such or which is generated from, e.g., PCS or $CaO_2$, with a metal chelate. One advantage of a metal chelate is that it is kept in solution under alkaline conditions allowing the $H_2O_2$ to react with the metal generating a modified Fenton process thereby producing hydroxyl free radicals which are very strong oxidants that degrade contaminants.

BACKGROUND OF THE INVENTION

The strongest oxidizing agent suitable for soil and groundwater remediation is the hydroxyl free radical. The typical way to generate OH radicals is through the Fenton system using $H_2O_2$ and ferrous ions at pH 3-4. Hydroxyl free radicals can also be generated by the use of a combination of ozone and $H_2O_2$ or UV and $H_2O_2$.

While these technologies are effective, they suffer from some drawbacks:
  Fenton technology is only suitable at a low pH, hence the need to acidify which requires the use of stainless steel piping and is expensive.
  Ozone/$H_2O_2$ technology requires on site generation of ozone and can be expensive.
  UV/$H_2O_2$ technology is not suitable for in-situ remediation.
  Hydrogen peroxide solutions are available in several concentrations. The typical concentration used in soil remediation is the 35% grade. This is further diluted to lower concentrations for example 5-12%, before introduction in the contaminated material to be treated.

Sodium percarbonate (PCS) is a peroxyhydrate composed of sodium carbonate and $H_2O_2$. Its solubility in water is ~12%. Upon dissolution in water, it releases its components and the resulting solution contains both soda ash and $H_2O_2$.

Calcium and magnesium peroxide are solid peroxygens that are insoluble in water. When they are mixed with water, they slowly release oxygen at their natural pH (>pH 10). They are used in soil and groundwater remediation to provide oxygen to aerobic bacteria thereby enhancing their capability of degrading various contaminants.

As the pH is lowered, $CaO_2$ and $MgO_2$ generate increasingly larger quantities of $H_2O_2$. For example, at a pH 8, approximately 60% of the active content of $CaO_2$ can be generated in the form of $H_2O_2$.

Whereas OH radicals can be generated at any pH due to $H_2O_2$ decomposition, the optimal use of this process for chemical oxidation occurs at a pH of 3-4 whereby the Fe ions remain soluble, and cycle between a ferrous and a ferric state.

U.S. Pat. No. 6,268,205 discusses the use of inorganic peroxides in conjunction with buffers and catalyst such as ferrous or ferric sulfate. The pH of such system is adjusted to 7-9. Under these conditions, the metal peroxides will release their activity partially as $H_2O_2$ and partially as oxygen. This allows for the initial chemical oxidation to take place starting the break up of the contaminants. The oxygen is then released more slowly, which will assist bioremediation over a period of several months. Although OH radicals can be generated from $H_2O_2$ at this pH, Fe will precipitate as ferric hydroxide. The net result is a reduced generation of OH radicals and clogging of the medium with the precipitated ferric hydroxide.

U.S. Pat. Nos. 5,741,427 and 6,319,328 are related to the use of Fe salts or chelates that are dissolved in water, the solution is maintained at pH 5-8, and then injected to a soil that has already been injected with an oxidizing agent. This pH is lower than the pH claimed in the above patent and would lead to a very fast release of $H_2O_2$ from the solid peroxides. The order of addition claimed results in a reduced activation of $H_2O_2$ as the peroxide would be partially decomposed prior to the injection of the metal chelate.

U.S. Pat. No. 6,843,618 is related to a method of decontaminating soil and ground water containing organic contaminants and divalent metal compounds. It comprises the steps of first treating such soils and ground water with an effective amount of an aqueous solution containing a peroxide and a water soluble chelating agent for a time sufficient to have the water soluble chelating agent chelate at least one of the divalent metals of the divalent metal compounds present in the soil and ground water. Next, the chelated metals are brought into contact with the peroxide to catalytically convert the peroxide to an oxidizing agent. Finally, the last step is contacting the organic contaminants in the soil and ground water with the oxidizing agent to oxidize the organic contaminants to environmentally safe, non-toxic compounds.

DETAILED DESCRIPTION OF THE PREFERRED EMBODIMENTS OF THE INVENTION

The invention is related to a kit for the combined chemical oxidation/assisted bioremediation of contaminated materials, comprising:
i. at least one metal chelate, and
ii. at least one peroxide compound.

The term "assisted bioremediation" is intended to denote enhancing the growth of aerobic microorganisms by supplying them with oxygen, thereby allowing them to multiply faster leading to an increased rate of degradation of the contaminants.

The "at least one metal chelate" comprises preferably a transition metal chelate such as Fe chelate.

The "at least one peroxide compound" comprises is most cases an inorganic peroxide. It comprises preferably at least one of Ca, Mg and Zn peroxide or sodium percarbonate or hydrogen peroxide. In some cases it is recommended that the kit comprises at least two different peroxide compounds. One of the two peroxides is most often chosen from sodium percarbonate and hydrogen peroxide. The other peroxide is in many cases chosen from Ca, Mg and Zn peroxides. Preferred combinations of two different inorganic peroxides include one of $H_2O_2$ and sodium percarbonate, and one of Ca, Mg and Zn peroxides (especially $CaO_2$), most preferably sodium percarbonate and one of Ca, Mg and Zn peroxides (especially $CaO_2$). The combination of one of $H_2O_2$ and sodium percarbonate and $CaO_2$ gives good results.

The invention is also related to a method for the combined chemical oxidation/assisted bioremediation of contaminated materials, comprising contacting a contaminated material with at least one metal chelate and at least one peroxide compound.

The contaminated material is in most cases soil or water. The metal chelate and the peroxide compound are as described above.

According to the method of the present invention, the metal chelate can be added to the contaminant/medium and/or a chelating agent can be added to a medium that already contains a transition metal such as Fe whereby the metal chelate forms in situ.

When at least two different peroxide compounds are used, the invention components (metal chelate and the two peroxides) can be added in any order. In some cases, it can be advantageous to add first the metal chelate and then in a later stage the two peroxides together or sequentially. In other cases, a peroxide compound, preferably one of Ca, Mg and Zn peroxides, is added in a first stage; then in a second stage the metal chelate is added and in a third stage, the second peroxide compound, preferably sodium percarbonate or hydrogen peroxide, is added. In any way, when sodium percarbonate or hydrogen peroxide are used, it is recommended to add the metal chelate before or together with the sodium percarbonate or hydrogen peroxide, preferably before. In other cases, the metal chelate is first added to the contaminated material in a first stage, then in a second stage the first peroxide compound is added, preferably sodium percarbonate or $H_2O_2$, and then the second peroxide compound is added preferably one of Ca, Mg, and Zn peroxides.

A preferred embodiment of the invention includes the use of at least one metal chelate, especially transition metal chelate, such as a Fe chelate, either as such, or in the form of the metal salt (e.g., ferrous or ferric salt) and a separate ligand (all of which are hereinafter referred to as "metal chelate"). The metal chelate can either be added together with all other components of a peroxide solution or slurry, or separate injections or additions to the material being treated may be made whereby the peroxide solution or slurry is added either before, during or after the metal chelate. Alternatively, the chelating agent may be added to the material being treated (e.g., soil) in order to chelate with metals such as Fe in the ground. A buffer can be also added either in the peroxide solution or slurry, or with the metal chelate to adjust the pH, preferably to 7-9. Preferred transition metals other than Fe include Mn and Cu, and are in particular those capable of generating OH radicals from $H_2O_2$. Optionally, products that are considered nutrients to microbes can also be added either separately or in combination with other products in a solution or slurry. As appropriate, some products may be injected or mixed in their dry form. Metal chelates described in U.S. Pat. No. 5,741,427 and U.S. Pat. No. 6,319,328 can be used herein. A preferred metal is Fe. Preferred chelating agents (ligands) include EDTA, citric acid, nitrilotriacetic acid, EDTA acid types, diethylenetriaminepentaacetic acid, hydroxyethylenediaminetriacetic acid, methyl glycinediacetic acid, phosphonates, and the TRILON® chelating agents of BASF, the brochure for which is incorporated herein by reference.

One objective of the invention is to create a dual acting system for catalytic oxidation of contaminated materials in soil and groundwater using oxidizing products in combination with a chelated metal catalyst (e.g., transition metal) as well as the generation of oxygen for assisted bioremediation. The chelating agent can be mixed in with the metallic catalyst or applied separately if sufficient amounts of the metallic catalyst already exist in the material to be treated.

In a preferred embodiment, the chelating agent should be added first, to allow for its reaction with the metals of the water, soil, etc. The chelating agent may for example be dosed at a level of 0.01-0.5% of, e.g., sodium percarbonate by moles. One suggested application rate is 0.1%. If a metal chelated complex is used, this can be of any transition metal but in particular of iron, manganese and copper, and is preferably added first.

The soil contaminants that can be effectively treated include petrochemicals, chlorinated organics, pesticides, energetics, perchlorates, etc.

Application can be accomplished in any manner, for example by introducing the solid, solution, or suspension in the material to be treated in any manner known in the art. Alternatively the peroxide (e.g., sodium percarbonate (PCS)) can be dissolved and introduced as a solution.

All components mentioned herein may be used as mixtures of such.

The relative amounts of invention compounds are not limited. Preferably, the mole ratio of metal chelate to peroxide is 0.01-10 metal chelate/peroxide, more preferably less than 1, for example 0.05, 0.1, 0.2, 0.3, etc. With regard to treatment, the amount of invention components applied to the material being treated is not limited, and can range for example from a ratio of for example 0.0001 to 10,000 (invention components in pounds (lbs)/cubic feet of material being treated). A generally useful range is 0.01-1.5, for example 0.2-1. A preferred range of dosing is up to 2,000 mg/L.

The source of peroxide may be any known in the art, for example any one or combination of $CaO_2$, $MgO_2$, PCS and/or $H_2O_2$. Preferred are $CaO_2$ and one of PCS or $H_2O_2$. While not bound by any theory, it is believed that the addition of $H_2O_2$ or PCS results in the immediate presence of $H_2O_2$, which quickly starts the oxidation reaction. The reaction then continues as a result of the slow release of $H_2O_2$ from the other sources, such as $CaO_2$ and/or $MgO_2$. The latter two products also generate oxygen for long term assisted bioremediation.

The peroxide compound (such as $CaO_2$) is typically added as a slurry. Two examples of typical concentrations are for instance about 20% by weight and about 35% by weight. The slurry could be more dilute if the material being treated is very porous.

Alternatively, the peroxide compound can be added as solid particles. They could be used in the soil remediation application as a solid mixed with the soil or as a solid mixed with another invention component. The solid particles can be used in the form of a powder or as granules. Granules of inorganic peroxides are described in the European patent application of SOLVAY filed under the number EP 05104226.5 on 19.05.2005, the content of which is incorporated herein by reference.

When the peroxide compound is sodium percarbonate, it can be used in the form of a solution or a suspension. Concentrations can be for example 8% by weight in the case of a solution and for example 20% by weight in the case of a suspension. A particularly suitable sodium percarbonate product has particles with a mean particle size in the range of from 100, to 400 µm. A 100 µm product may offer advantages in handling because it is a finer material compared to classical products. It is easier to dissolve and pumping its suspension is also easier. Sodium percarbonate can also be mixed with the soil in a solid form either by simple mixing or by incorporation with the machine that is excavating the soil during excavation.

The metal chelate is typically added in the form of a solution. The solution concentration can be for example 4% by weight. The metal chelate can be prepared ex situ, for instance in the case of a Fe chelate it can be prepared ex situ by mixing an iron salt such as $FeSO_4$ with the chelating agent solution. One way to do this consists in mixing 0.9 kg Fe salt with 7.6 L of 40% chelating agent solution (3 kg of chelant (100%)), and by diluting this solution four fold.

The combined chemical oxidation/assisted bioremediation treatment according to the invention can further be combined with any other suitable treatment.

This invention has advantages over U.S. Pat. No. 6,268,205 in that the metal chelate has a greater ability to catalyze the chemical oxidation as, e.g., Fe hydroxide would not precipitate. This approach is also better than U.S. Pat. Nos. 5,741, 427 and 6,319,328 in that the higher pH will allow for the slow release of oxygen over a greater period of time, thus assisting the naturally occurring microbes in degrading the contaminant.

The current invention also has advantages over U.S. Pat. No. 6,843,618 in that it allows for both chemical oxidation and assisted bioremediation of contaminants. Further, the chemical oxidation can occur in two stages encompassing an immediate oxidation followed by an extended reaction due to the slow release of $H_2O_2$ and oxygen from the $CaO_2$ or $MgO_2$ or $ZnO_2$. This invention also allows for the addition of the various components in any suitable sequence which improves the effectiveness of treatment.

The above written description of the invention provides a manner and process of making and using it such that any person skilled in this art is enabled to make and use the same, this enablement being provided in particular for the subject matter of the appended claims, which make up a part of the original description.

All references, patents, applications, tests, standards, documents, publications, brochures, texts, articles, etc. mentioned herein are incorporated herein by reference. Where a numerical limit or range is stated, all values and subranges therewithin are specifically included as if explicitly written out.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

Example 1

Soil and groundwater at a former fuel distribution demonstration site were contaminated with petroleum hydrocarbon from 19 former underground storage tanks (USTs) over the one acre property. Depth to groundwater (DTW) in the primary source treatment area was approximately 16 feet below ground surface (ft bgs) and ranged as deep as 22 ft bgs over the remainder of the plume. The aquifer primarily consisted of clayey sand with low levels of naturally occurring organic carbon. Soil contamination primarily existed from the base of the UST excavation depth of approximately 13 ft bgs and into the groundwater. The excavated UST pits were primarily backfilled with soft sedimentary rock allowing high infiltration rates during precipitation events. The soil has high in iron content.

Free-phase petroleum 0.04 to 0.07 ft thick was consistently detected in the two wells located in the primary source area prior to treatment. However, source area dissolved phase concentrations were low due either to continued influx of uncontaminated groundwater or because the contaminants were highly adsorbed in the soil with very little product extractable from the dissolved phase. Contaminant concentrations downgradient indicate that low concentrations are likely the result of fresh influx of groundwater.

The existence of free-phase hydrocarbons warranted a dual stage remedial approach including chemical oxidation and bioremediation treatment. Chemical oxidation with sodium percarbonate was initiated to quickly reduce sorbed phase and free phase petroleum constituents, as well as supply an oxygen boost to the aquifer. Calcium peroxide was applied concurrently to provide a slow release source of hydrogen peroxide as well as oxygen for enhancing aerobic microbial growth. In the presence of high concentrations of contaminants, it is difficult to supply enough oxygen to sustain aerobic microbal growth and resultant contaminant degradation. Application of calcium peroxide alone for the purpose of enhancing bioremediation would not be effective on high contaminant or free-phase concentrations. The dual stage approach was initiated only in the primary source area, the majority of the site was treated with calcium peroxide alone.

The dual stage application is the topic of this example. The source area injection grid was designed on approximately 5 foot centers to promote contact of contaminants with high concentration of the chemicals. Treatment was applied to the superficial ten feet of groundwater and one foot of unsaturated soils immediately above the groundwater table by injecting chemicals in the form of a suspension or solution through the one-inch rods of a Geoprobe Model 6600 geoprobe direct push truck mounted rig.

The chemicals were applied as follows in each injection:
First a suspension of calcium peroxide in water was injected at a depth of 19-26 ft bgs. The suspension was ~28% prepared using 75 lbs calcium peroxide suspended in 120 gallons of water.
The soil contained a high Fe content, therefore a chelating agent was added and allowed to react with Fe in the soil in order to produce the Fe chelate. The chelating agent was immediately injected after the injection of the calcium peroxide slurry and in a similar manner at a depth of 15-19 ft bgs. Approximately 8 gallons of Trilon M solution (39-41% methylglycinediacetic acid—MGDA-Na₃) were diluted with water in a ratio of 1:10 chelant to water.

After a period of 2-4 hours, the sodium percarbonate was injected at a depth of 15-19 ft bgs. The aqueous solution/suspension had a concentration of 8-12% and about 75 lbs sodium percarbonate were used.

The hydraulic conductivity of the formation was great enough that significant back pressure did not occur during injection.

A second injection was made after 23 weeks without adding the chelating agent as it was considered that the Fe chelate formed after the first injection was still present in the soil. Groundwater samples from site wells located within and outside of the contaminant plume were collected for laboratory analyses 7 weeks prior to the initial treatment and 13, 23, and 40 weeks after the initial injection. Field physicochemical measurements have been collected monthly following the initial injection.

Results

During the initial injection of sodium percarbonate, a brown foam was observed at the surface resulting from the reaction of the oxidant and petroleum contaminated groundwater. This resulted in the elimination of the free-phase contaminants. It is assumed a similar reaction occurred throughout the contaminated zone in the subsurface. The low levels of naturally occurring organic carbon allowed the reaction to occur primarily upon the contaminants.

The following tables show the effect of treatment. In summary

Disappearance of the free product at the source area where the injection was made, with a drop from ~0.07 ft to no detection after 32 weeks.

BTEX (benzene, toluene, ethylbenzene, xylenes) and naphthalene concentration.

In the source area, these contaminants were adsorbed onto the soil and could not be detected in the aqueous phase. Upon treatment, their levels first increased in the aqueous phase through desorption and then dropped in concentration over the period of the treatment.

A downgradient well that had a large concentration of these contaminants showed a decrease in contaminants level over the treatment period. After 40 weeks, some rebound was observed likely due to the consumption of the peroxide compounds, requiring a re-injection.

Specific conductance is an indication of dissolved organics. The higher the value, the greater the dissolved organics. Specific conductance dropped after treatment but rebounded later indicating an additional amendment application is needed to continue product degradation.

Oxidation Reduction Potential (ORP) is an indication of the oxidizing potential of the medium. In a completely treated soil, this value should be positive. In this case, due to the very high contamination, the value remained negative throughout the treatment but slowly increased.

Source area: increased from −162 to −16 mV after 40 weeks.

Immediately downgradient: increased from −153 to +332 mV but dropped later to −2 mV after 40 weeks.

Overall, the treatment has been highly successful at eliminating the free-phase hydrocarbons in the primary source area. A third dual stage application is planned to reduce the sorbed phase petroleum hydrocarbons in the unsaturated zone above the treatment area.

Disappearance of the free product at the source area where the injection was made, with a drop from ~0.07 ft to no detection after 32 weeks.

BTEX (benzene, toluene, ethylbenzene, xylenes) and naphthalene concentration.

In the source area, these contaminants were adsorbed onto the soil and could not be detected in the aqueous phase. Upon treatment, their levels first increased in the aqueous phase through desorption and then dropped in concentration over the period of the treatment.

A downgradient well that had a large concentration of these contaminants showed a decrease in contaminants level over the treatment period. After 40 weeks, some rebound was observed likely due to the consumption of the peroxide compounds, requiring a re-injection.

Specific conductance is an indication of dissolved organics. The higher the value, the greater the dissolved organics. Specific conductance dropped after treatment but rebounded later indicating an additional amendment application is needed to continue product degradation.

Oxidation Reduction Potential (ORP) is an indication of the oxidizing potential of the medium. In a completely treated soil, this value should be positive. In this case, due to the very high contamination, the value remained negative throughout the treatment but slowly increased.

Source area: increased from −162 to −16 mV after 40 weeks.

Immediately downgradient: increased from −153 to +332 mV but dropped later to −2 mV after 40 weeks.

Overall, the treatment has been highly successful at eliminating the free-phase hydrocarbons in the primary source area. A third dual stage application is planned to reduce the sorbed phase petroleum hydrocarbons in the unsaturated zone above the treatment area.

|  | 7 weeks before treatment | Weeks since Treatment | | | | | | |
| --- | --- | --- | --- | --- | --- | --- | --- | --- |
|  |  | 4 | 9 | 13 | 17 | 23 | 32 | 40 |
| Source Area (MW-7) |  |  |  |  |  |  |  |  |
| Benzene - µg/L | nd |  |  | 80 |  | 42 |  | 16 |
| Toluene - µg/L | nd |  |  | 35 |  | nd |  | 6.0 |
| Ethylbenzene - µg/L | nd |  |  | 370 |  | 9 |  | 67 |
| Xylenes (total) - µg/L | nd |  |  | 750 |  | 19 |  | 160 |
| MTBE - µg/L | nd |  |  | nd |  | nd |  | nd |
| Isopropylbenzene (cumene) - µg/L | nd |  |  | 36 |  | nd |  | nd |
| Naphthalene - µg/L | 11 |  |  | 110 |  | 7 |  | 19 |
| Free product sheen - ft | 0.07 | 0.04 | 0.04 | 0.01 | 0.02 | 0.02 | 0.00 | 0.00 |

-continued

|  | 7 weeks before treatment | Weeks since Treatment | | | | | | |
|---|---|---|---|---|---|---|---|---|
|  |  | 4 | 9 | 13 | 17 | 23 | 32 | 40 |
| Specific conductance - ohms | na | 2,108 | 1,620 | 937 | 1,117 | 1,030 | 1,345 | 1,525 |
| ORP - mV | na | −162 | −180 | −163 | −138 | −136 | −108 | −16 |
| pH | na | 6.3 | 5.7 | 6.0 | 6.2 | 6.5 | 6.5 | 6.5 |
| Immediately downgradient MW-6 | | | | | | | | |
| Benzene - μg/L | 2,300 | | | 49 | | 67 | | 850 |
| Toluene - μg/L | 23 | | | nd | | nd | | 8 |
| Ethylbenzene - μg/L | 40 | | | nd | | nd | | 26 |
| Xylenes (total) - μg/L | 1,000 | | | 33 | | 31 | | 250 |
| MTBE - μg/L | 25 | | | nd | | nd | | 8 |
| Isopropylbenzene (cumene) - μg/L | 45 | | | nd | | nd | | 14 |
| Naphthalene - μg/L | 29 | | | nd | | nd | | nd |
| Free product sheen - ft | — | — | — | — | — | — | — | — |
| Specific conductance - ohms | 2,050 | 1,160 | 824 | 651 | 779 | 608 | 1,458 | 2,418 |
| ORP - mV | −153 | −24 | 311 | 332 | 3 | 163 | −41 | −2 |
| pH | 6.5 | 6.1 | 6.0 | 6.0 | 6.4 | 6.4 | 6.1 | 6.6 | nd = non detected
na = not available (not measured)

Example 2

Another site was contaminated with Diesel Range Organics (DRO) and petroleum hydrocarbons. The water table was high in this site as it is located next to a river. The depth to the groundwater (DTW) was about 14 ft.

Application

Due to the low iron at this site a ferrous chelate was formed ex-situ prior to injection.

The injections were done as follows:
1. Two pounds of ferrous sulfate were mixed with 2 gallons of chelant (Trilon M). Several hours later, the solution was diluted with water at a volume ratio of 1:4 chelate:water.
2. The solution was equally applied in 16 wells as the Geoprobe rods were advanced through the water table.
3. As the rods were pulled out of the hole, a sodium percarbonate slurry was pumped at a concentration of 20%. About 47 lbs sodium percarbonate were injected in each well (750 lbs sodium percarbonate were used for the 16 holes).
4. This was followed by injecting a 20% calcium peroxide slurry. About 17 lbs of calcium peroxide were injected in each well (275 pounds CaO$_2$ suspended in 160 gallons of water for the 16 holes). This material was also applied from the bottom up.

The 16 injection points were installed in a circle around the monitoring well, with 8 located at 5 feet from the monitoring well, and the other 8 located at a distance of 10 feet from the monitoring well.

Results

A few wells showed a dramatic increase in dissolved oxygen shortly after infection.

| Centre Area (MW-23) | 5 days before treatment | Days from Treatment | | |
|---|---|---|---|---|
|  |  | 1 | 7 | 30 |
| Specific conductance - ohms | 568 | 533 | 546 | 657 |
| ORP - mV | −109.6 | 247 | 127 | 126 |
| Dissolved oxygen conc. - mg/L | 1.48 | 1.17 | 1.49 | 2.29 |
| pH | 7.13 | 7.01 | 7.16 | 8.29 |

The invention claimed is:

1. A method for the combined chemical oxidation/assisted bioremediation of a contaminated material, the method comprising:
   adding (A) a preformed metal chelate, (B) at least one selected from the group consisting of Ca, Mg, and Zn peroxide, (C) hydrogen peroxide, and (D) a buffer to a contaminated material,
   wherein the preformed metal which is Fe, chelate comprises a metal and a ligand, wherein the ligand is citric acid,
   wherein the buffer is added to adjust the pH of the contaminated material to a value from 7 to 9, and
   wherein the preformed metal chelate (A) is added separately from the peroxides (B) and (C).

2. The method of claim 1, wherein the contaminated material is soil or water.

3. The method of claim 1, wherein the at least one of Ca, Mg and Zn peroxide (B) is added in a first stage, the preformed metal chelate (A) is added in a second stage, and the hydrogen peroxide (C) is added in a third stage.

4. The method of claim 1, wherein the preformed metal chelate (A) is added in a first stage, the hydrogen peroxide (C) is added in a second stage, and the at least one of Ca, Mg and Zn peroxide (B) is added in a third stage.

5. The method of claim 1, wherein the preformed metal chelate (A) is added in a first stage, the at least one of Ca, Mg and Zn peroxide (B) is added in a second stage, and the hydrogen peroxide (C) is added in a third stage.

6. The method of claim 1, wherein the contaminated material is soil.

7. The method of claim 1, wherein the contaminated material is water.

8. The method of claim 3, wherein the first peroxide (B) is CaO$_2$.

9. The method of claim 4, wherein the first peroxide (B) is CaO$_2$.

10. The method of claim 5, wherein the first peroxide (B) is CaO$_2$.

11. The method of claim 1, wherein the preformed metal chelate (A) is added in a first stage, and the at least one of Ca, Mg, and Zn peroxide (B) and the hydrogen peroxide (C) are added in a second stage.

12. The method of claim 11, wherein CaO$_2$ and hydrogen peroxide are added in the second stage.

13. The method of claim 1, wherein the preformed metal chelate (A) and the buffer (D) are added in a first stage, and the at least one of Ca, Mg, and Zn peroxide (B) and the hydrogen peroxide (C) are added in a second stage.

14. The method of claim 13, wherein the preformed metal chelate and the buffer (D) are combined prior to being added to the contaminated material.

15. The method of claim 14, wherein $CaO_2$ and hydrogen peroxide are added in the second stage.

* * * * *

UNITED STATES PATENT AND TRADEMARK OFFICE
CERTIFICATE OF CORRECTION

PATENT NO. : 8,579,544 B2  
APPLICATION NO. : 12/906282  
DATED : November 12, 2013  
INVENTOR(S) : Noel Boulos et al.

Page 1 of 1

It is certified that error appears in the above-identified patent and that said Letters Patent is hereby corrected as shown below:

In the Claims:

Column 11, line 6, "chelate and the buffer (D)" should read --chelate (A) and the buffer (D)--.

Signed and Sealed this
Twenty-fifth Day of February, 2014

Michelle K. Lee
*Deputy Director of the United States Patent and Trademark Office*